United States Patent [19]

Hugley

[11] 4,122,969
[45] Oct. 31, 1978

[54] SAFETY CLOSURE APPARATUS FOR PRESSURE VESSELS

[76] Inventor: Dale G. Hugley, 3815 Timberline Dr. So., Fort Worth, Tex. 76119

[21] Appl. No.: 796,215

[22] Filed: May 12, 1977

[51] Int. Cl.² .................. B65D 45/00; B65D 51/18
[52] U.S. Cl. ................... 220/256; 220/316; 220/367; 220/DIG. 20
[58] Field of Search ............. 220/316, 303, 327, 328, 220/367, 356, 206, 208, 366, 231, 315, 256, DIG. 20, 367; 137/377; 251/215, 216, 343, 349; 292/256, 6

[56] References Cited

U.S. PATENT DOCUMENTS

| | | | |
|---|---|---|---|
| 1,521,093 | 12/1924 | Hall | 220/231 |
| 1,630,672 | 5/1927 | Sage | 220/315 |
| 1,818,249 | 8/1931 | Groble | 220/367 |
| 1,900,627 | 3/1933 | Willoughby | 220/367 |
| 2,226,593 | 12/1940 | Stroupe et al. | 220/316 |
| 2,509,671 | 5/1950 | Christensen | 251/344 |
| 2,519,572 | 8/1950 | Hill | 220/256 |
| 2,854,018 | 9/1958 | Kilmarx, Jr. | 251/343 |
| 3,141,008 | 7/1964 | Flick et al. | 220/327 |
| 3,323,541 | 6/1967 | Schneider, Jr. et al. | 220/327 |
| 3,376,898 | 4/1968 | Hugley | 138/137 |
| 3,425,664 | 2/1969 | Niskin | 251/344 |
| 3,456,679 | 7/1969 | Graham | 220/206 |
| 3,458,083 | 7/1969 | Erwin, Jr. | 220/316 |

FOREIGN PATENT DOCUMENTS 1,416,707  12/1975  United Kingdom .............. 220/256

Primary Examiner—William Price
Assistant Examiner—Allan N. Shoap
Attorney, Agent, or Firm—Thomas L. Cantrell; Joseph H. Schley

[57] ABSTRACT

Disclosed is a safety closure apparatus for a pressure vessel, particularly for a vessel such as a pump stabilizer which has a gas compartment and a liquid compartment therein, both of which are normally pressurized. The apparatus includes a safety head configured to cover the closure means of the vessel to prevent its actuation; a liquid pressure bleed valve which must be removed before the safety hood can be moved off of the closure means, thereby insuring depressurization of the liquid compartment prior to opening; and gas pressure bleed means automatically operable upon movement of the safety hood off of the closure means, thereby also insuring depressurization of the gas compartment before access can be had to the closure means to actuate it to open the vessel.

8 Claims, 5 Drawing Figures

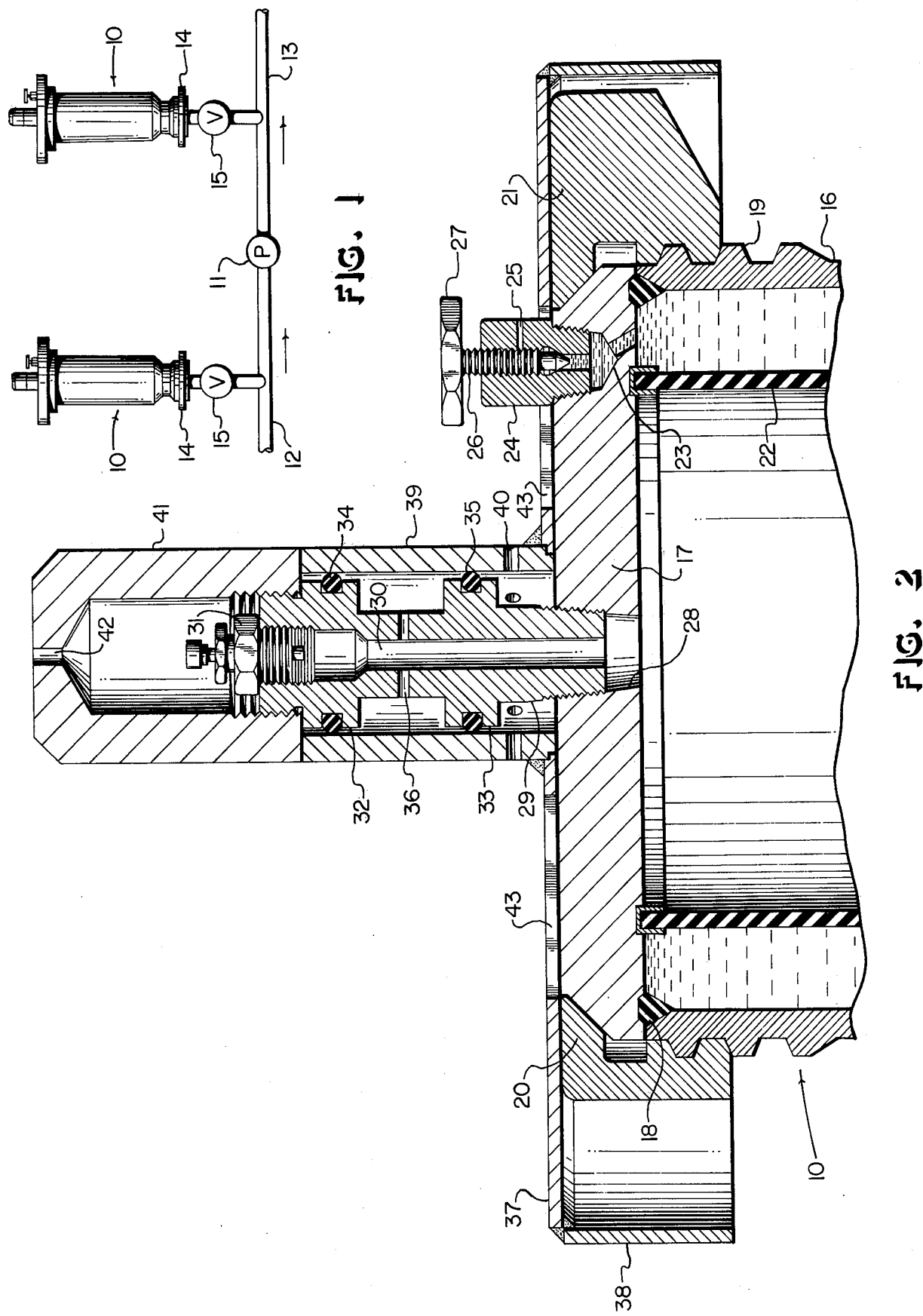

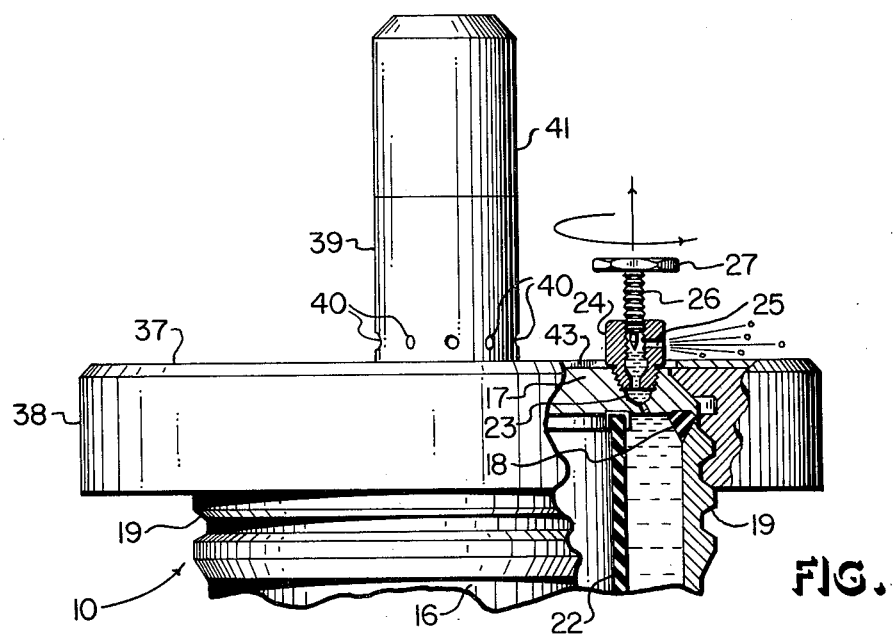
FIG. 3
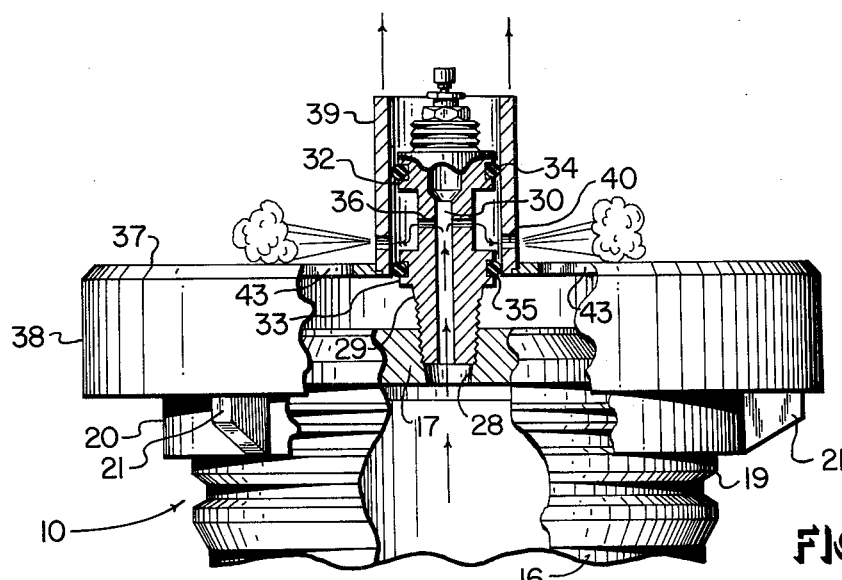
FIG. 4
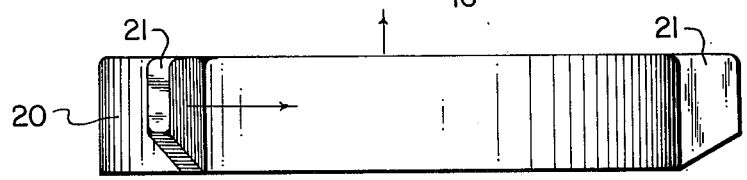
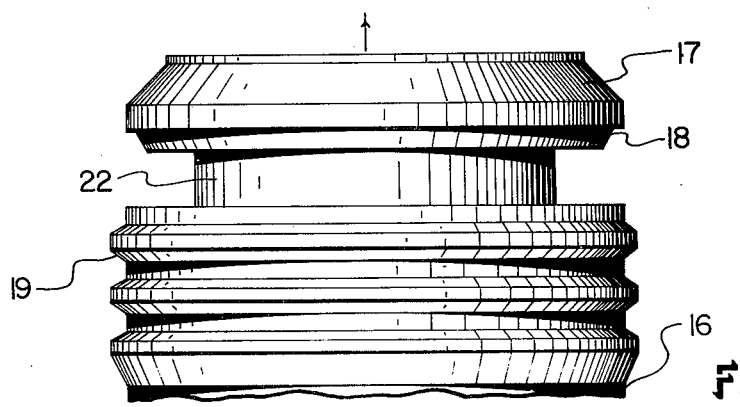
FIG. 5

SAFETY CLOSURE APPARATUS FOR PRESSURE VESSELS

BACKGROUND OF THE INVENTION

Pressure vessels are constructed in many forms and sizes for confining liquids and/or gases in various applications. A common characteristic of such vessels is the provision of an opening therein, with an attached closure means, to give access to the interior of the vessel for cleaning, inspection, servicing, and installation of internal parts. A safety problem is thus presented: serious or fatal injuries can occur (and have occured) when an attempt is made to open the closure means before the vessel is depressurized. Thus there is a need for apparatus which renders it substantially impossible to open the closure means of a pressure vessel until the internal pressure has been bled off.

While the safety problem just outlined inheres in pressure vessels generally, it is presented in a more acute form in those pressure vessels having more than one pressure compartment therein, because failure to depressurize any one of the compartments will create an unsafe condition when an attempt is made to open the vessel. A worker who has depressurized one compartment may easily misconceive that the entire vessel is depressurized and safe to open.

An example of a multi-compartment pressure vessel, and one to which the present invention is particularly applicable, is a pulsation stabilizer of the general kind shown and described in my prior U.S. Pat. No. 3,376,898 issued Apr. 9, 1968. Pulsation stabilizers are employed to dampen destructive pressure surges in lines at the inlets and outlets of pumps for both liquids and gases. Typically, such stabilizers comprise an open-ended, usually cylindrical, case with fittings for admitting the fluid to be damped into the case. The open end of the case is normally closed by a closure plate having a gas fillable cartridge mounted thereon. When the closure plate is placed over the open end of the case, the gas cartridge extends into the case and occupies a significant portion of its volume. Typically, the closure plate has two bores therethrough, one to be equipped with valve means for pressurizing and depressurizing the gas cartridge and the other to be equipped with valve means for bleeding off pressure in the case exteriorly of the cartridge. In a typical stabilizer, the closure plate is held in pressure-tight engagement with the open end of the case by closure means, which may take various forms, such as a hold-down nut threaded on to the case, a set of clamps, nuts engaging studs on the case, etc.

When a worker approaches a stabilizer vessel to service it, he first closes an external valve in the line between the pump and the vessel. This isolates the vessel from the pressure source, but does not depressurize it. It is essential that both of the above mentioned valve means be actuated to depressurize both the case and the gas cartridge, before the closure means can safely be actuated to force the closure plate from the case.

SUMMARY OF THE INVENTION

In accordance with the present invention, a safety closure apparatus is provided which renders it substantially impossible to actuate the closure means of a pressure vessel, especially a multi-compartment pressure vessel, until all parts of the vessel have been depressurized. In the apparatus of the invention, a safety hood is provided which is configured and sized to cover and thereby block access to the actuating surfaces of the closure means. (The closure means actuating surfaces may vary considerably in structure, depending on the type of closure means with which the vessel is equpped. Wrenching lugs on a nut are a typical illustration of "actuating surfaces".)

The safety hood cannot be moved away from the closure means until a pressure bleed valve is first actuated to depressurize at least one portion of the vessel. In the preferred embodiment of the invention, this is accomplished by slotting the safety hood, passing the body of a needle type bleed valve through the slot into a bore in the closure plate, and inserting a needle stem with an actuating knob of greater diameter than the slot into the valve body. If one attempts to move the safety hood off of the closure means without first removing the needle valve stem, the attempt will be frustrated because the slot of the hood is too small to pass over the knob of the valve stem. Removal of the needle valve stem depresurizes at least part of the vessel, and eliminates the stem knob as a barrier to removal of the safety hood.

In accordance with a further aspect of the invention, a specially configured hollow stem is inserted into another bore in the closure plate to communicate with another pressurized compartment of the vessel. This stem is configured to cooperate with a cylindrical section of the safety hood to establish a small pressurized zone a spaced distance outside of the vessel proper, but in communication with a pressurized compartment within the vessel. The cylindrical section of the hood is apertured in the region thereof lying between the external pressurized zone and the vessel proper. As the hood is drawn away from the vessel, the aperture(s) come into registry with the external pressurized zone, and both it and the vessel compartment with which it communicates are vented to atmosphere through the aperture(s) and are thus depressurized.

From the foregoing, it can be seen that in accordance with one aspect of the invention, depressurizing is done in order to make useful movement of the hood off of the closure means possible, and in accordance with another aspect of the invention, depressurizing is accomplished automatically, in the course of movement of the hood away from the closure means. The two aspects of the invention may be exploited separately if desired, in a single compartment vessel, and in a vessel with two or more compartments, one or the other may be used for each compartment.

Accordingly, it can be seen that the principal objects of the invention are the provision of safety closure apparatus for pressure vessels, particularly two-compartment pulsation stabilizers, which is simple in construction, effective in operation, and substantially fool-proof.

The manner in which these objects, together with other objects and purposes are accomplished can best be understood from a consideration of the detailed description which follows, together with the accompanying drawings.

DESCRIPTION OF THE DRAWINGS

FIG. 1 is a diagrammatic elevational view of a pump with two pulsation stabilizers equipped with the safety closure apparatus of the invention installed on its inlet and outlet lines;

FIG. 2 is an enlarged fragmentary sectional elevational view of the end portion of a puslation stabilizer equipped with the safety closure apparatus of the invention;

FIG. 3 is a reduced scale fragmentary elevational view, partly in section, of the device of FIG. 2, showing a first stage in depressurizing and disassembly;

FIG. 4 is another fragmentary elevational view, partly in section, on the same scale as FIG. 3, showing a second stage in depressurizing and disassembly; and FIG. 5 is a further fragmentary elevational view, on the same scale as FIG. 3, showing the final stage in the disassembly or opening of the pulsation stabilizer of FIG. 3.

DESCRIPTION OF A PREFERRED EMBODIMENT

In FIG. 1, two pulsation stabilizers 10 are shown in association with a pump 11, one stabilizer being mounted on the intake line 12 and the other being mounted on the outlet line 13. Each stabilizer has a fitting 14 for connecting it to its line, and valves 15 are provided for isolating the respective stabilizers from their lines, and hence from the pressure sources. Such isolation, however, does not effect depressurization of the stabilizers to render them safe to open or disassemble.

FIG. 2 illustrates the end of a stabilizer opposite fitting 14, with the safety closure apparatus of the invention applied thereto. Stabilizer 10 comprises a cylindrical case 16 which is open-ended and is adapted to receive closure plate 17 in pressure-tight engagement with its open end, gasket 18 being provided to aid in attaining pressure tightness. Case 16 is externally threaded, as at 19, and a closure means in the form of retainer nut 20 is threaded onto case 16 to bear against the closure plate end urge it into pressure-tight engagement with the end of case 16. As was mentioned above, various other types of closure means are also employed by those skilled in the art, such as clamps, studs and nuts, etc. The particular form of the closure means is not a critical aspect of the invention. Retainer nut 20 is provided with several circumferentially spaced wrenching lugs 21, which are engagable by a tool for tightening and untightening the nut. Lugs 21 are generically termed herein "actuating surfaces" and are illustrative of a variety of such elements which will vary widely in configuration depending upon the particular form of closure means employed, but which share the characteristics of being external to the case and engagable by a tool to tighten and untighten the closure means.

Mounted on the inner side of closure plate 17 is gas fillable cartridge 22, which is generally cylindrical in shape and closed at its other end. Cartridge 22 is at least partly formed of an elastic material so that it can flex in response to pressure pulsations in the working fluid being pumped by the pump. Cartridge 22 is gas-fillable so that it can compress to the extent necessary to respond to a pressure pulse in the working fluid, with the gas contained within the cartridge compressing during a pulse, and then expanding in the rarefaction following the pulse to thereby dampen the pulsation action as a whole.

The working fluid being pumped occupies the space within case 16 which is exterior to cartridge 22. In FIGS. 1 and 2 it is shown as a liquid, but it should be remembered that pulsation stabilizers are also used in association with gas pumps and compressors, and that in such cases the working fluid is a gas. The present invention is applicable in either case, not withstanding occasional references herein to "liquid" and "liquid pressure" in discussions of the working fluid and equipment for handling it.

Closure plate 17 is provided with a liquid pressure bleed bore 23 which exends through the plate from the interior to the exterior side. Into bore 23 is threaded bleed valve body 24, which has a side vent 25. A needle valve stem 26 is threaded into the body 24. In FIG. 2 it is shown seated, blocking the side vent, while in FIG. 3, discussed more fully below, it is shown unseated, so that pressure may be released through the vent.

Needle valve stem has an actuating knob 27 of fairly large diameter. The diameter of knob 27 is critically related to the dimensions of the safety hood, as discussed below.

Closure plate 17 is provided with a second bore 28 which extends from the inner face of the plate, within the gas cartridge, to its upper surface. It is through bore 28 that the cartridge is charged with gas and depressurized. In accordance with the invention, a specially configured hollow stem 29 is threaded into bore 28. Stem 29 has an axial bore 30 passing therethrough, and a gas valve 31 at the upper end of bore 30. The exact form of valve 31 is not critical to the present invention, and any of a variety of valves from the pneumatic tire art may be used, provided their pressure rating is satisfactory.

In accordance with the invention, stem 29 is provided with a pair of integral transverse spaced discs 32 and 33, each of which is provided with an O-ring seal 34, 35 on its periphery. It should be noted that discs 32 and 33 are substantially equal in diameter and are generated about the same axis, preferably the axis of stem 29. Disc 33 is spaced a selected distance above the outer surface of closure plate 17, and disc 32 is axially spaced above disc 33, but is below valve 31. In the portion of stem 29 lying between discs 32 and 33, transverse apertures 36 are formed to place bore 30 in communication with the volume lying between the discs.

Safety hood 37 overlies closure plate 17 and closure nut 20, and has a depending skirt portion 38 which surrounds nut 20 and blocks access to its actuating surfaces or wrenching lugs 21. In the embodiment shown in the drawings, safety hood is a substantially round open bottomed cylinder, since this is an appropriate and efficient configuration for convering a closure nut having wrenching lugs. However, the safety hood may be given other appropriate configurations to cover closure means of other types, such as clamps, etc. in which case it may best be made oblong or rectangular or otherwise in plan.

The top surface of hood 37 has a plurality of slots or apertures 43 formed therein. They are distributed on the surface of the hood so that one of them may conveniently be registered with valve body 24 and passed over it in the course of installing the safety hood. Slots 43 are so dimensioned and positioned on the hood that at least one edge of the slot which surrounds valve body 24 lies closer to the valve body than the edge of needle valve actuating head or knob 27 when the latter is installed. In this way, assurance is obtained that knob 27 will interfere with removal of the hood until and unless it is first removed.

Safety hood 37 is provided with an upstanding cylindrical portion 39 which is sized and positioned to fit over stem 29 when the hood is fully installed. The walls of cylinder 39 are heavy enough to confine gas under the pressure obtaining in the cartridge, and the inner diameter of the cylinder is such that it sealingly engages discs 32, 33, and their O-ring seals 34, 35. The cylinder, discs, and seals jointly comprise a pressure-tight zone or compartment which is positioned externally of case 16 but which is in pressure communication with the interior of the case, and specifically with the interior of cartridge 22.

Cylinder 39 is provided with a plurality of transverse vents or apertures 40 which are positioned below disc 33 when the safety hood is fully installed as shown in FIG. 2. When the hood is lifted upwardly, they come into registry with the above mentioned external pressure compartment, and vent both it and cartridge 22 to atmosphere.

Threaded onto the upper end of stem 29, and in abutment with cylinder 39, is cap 41, which serves to protect gas valve 31 and to act as a secondary barrier to the removal of safety hood 37. The cap is vented at 42 to prevent build up of pressure therein, in the event valve 31 leaks.

A consideration of FIGS. 2 through 5 in sequence will reveal the mode of operation of the preferred embodiment of the invention. The equipment is shown in its fully installed condition FIG. 2, and it collectively maintains stabilizer 10 in a pressure tight state.

To open stabilizer 10 for servicing, one first closes valve 15 (FIG. 1) to isolate the unit from the source of pressure. Next, as shown in FIG. 3 actuating head or knob 27 is rotated to unthread needle valve stem 26 from valve body 24. As the stem is withdrawn past vent 25, the pressure on liquid in case 16 is vented down to atmospheric through vent 25. Rotation of knob 27 is continued until it and stem 26 are completely freed of valve body 24. When cap 41 is also unthreaded from the unit, it becomes possible to lift safety head 37 away from closure nut 20.

FIG. 4 shows safety hood 37 being lifted away from retainer nut 20, thus exposing wrenching lugs 21. As the cylinder 39 of the hood slides upwardly with respect to discs 32, 33, its apertures 40 move into registry with the pressurized space between the discs and the pressure in this space and cartridge 22 (via bore 30 and apertures 36) is vented to the atmosphere. Arrows on FIG. 4 indicate the path of gas flow during the venting of the cartridge.

It should be noted that in accordance with the invention, the pressurized gas in cartridge 22 is unable to exert any lifting force on safety hood 37, either in its installed position (FIG. 2) or while it is being lifted (FIG. 4), because at no time is a downwardly facing surface of hood 37 presented to the gas.

As is indicated somewhat diagrammatically in FIG. 5, with safety hood 37 fully removed from the unit retainer nut 20 may be rotated by means of its actuating surfaces (lugs) 21, which are now accessible to a tool, to unthread the nut from case 16 and make it possible to lift closure plate and cartridge 17 away from the case. (For simplicity in illustration, stem 29 is omitted from FIG. 5)

In the pressure vessel shown and described herein, the closure plate 17 and retainer nut or closure means 20 are separate parts. From the discussion above it will be clear to those skilled in the art that the safety closure apparatus of the invention can also be applied to pressure vessels in which these two parts are combined into a single closure means, for example, the vessel shown in my above mentioned U.S. Pat. No. 3,376,898.

From the foregoing, it can be seen that a simple, effective, and substantially fool proof safety closure apparatus is provided by the invention for pulsation stabilizers and other pressure vessels.

I claim:

1. Safety closure apparatus for a pressure vessel having closure means with actuating surfaces thereon, said apparatus comprising:
    a safety hood mounted on said closure means, said hood being generally conformed in shape to said closure means and having portions positioned to cover and block access to the actuating surfaces of said closure means;
    projecting means attached to said closure means within the confines of said safety hood and extending outwardly from said closure means and said pressure vessel for forming a pressurizable compartment spaced outwardly and away from said pressure vessel but in pressure communication with the interior thereof;
    said safety hood having a portion thereof shaped and positioned to form an outwardly slidable wall of said pressurizable compartment, said portion further extending inwardly between said compartment and said vessel when said hood is mounted on said closure means, said portion further being apertured in said inwardly extended region;
    whereby upon outward movement of said safety hood away from said closure means to uncover and give access to its actuating surfaces, the aperture of said slidable wall portion of the hood moves into registry with said pressurizable compartment to thereby vent it and also vent said pressure vessel through the communication path between said vessel and said compartment.

2. Safety closure apparatus in accordance with claim 1 in which said pressurizable compartment forming means comprises a hollow outwardly extending stem having a pair of transverse discs formed on the exterior thereof, and a transverse aperture therein between said discs; and in which said slidable wall forming portion of said safety hood comprises an outwardly extending cylinder in sliding sealing engagement with said discs.

3. Safety closure apparatus in accordance with claim 1 especially adapted for use with a pressure vessel having another pressure compartment therein, said apparatus further comprising:
    a vent valve for said other pressure compartment; and
    actuating means for said vent valve sized and positioned to prevent outward removal of said safety hood from said closure menas until said actuating means is first removed to thereby vent said other pressure compartment.

4. Safety closure apparatus in accordance with claim 3 in which said safety hood is slotted to fit over said vent valve, and said vent valve actuating means comprises a knob; said slot having an edge lying radially closer to said vent valve than the edge of said knob.

5. Safety closure apparatus for a pressure vessel having closure means with actuating surfaces thereon, said apparatus comprising:
    a safety hood mounted on said closure means, said hood being generally conformed in shape to said closure means and having portions positioned to cover and block access to the actuating surfaces of said closure means and to give access to said actuating surfaces upon outward movement of said hood away from said closure means;
    a vent valve for said vessel mounted on said closure means;

actuating means for said vent valve;

said safety hood being slotted to fit over said vent valve, said actuating means for said vent valve comprising a knob extending over a portion of said hood outwardly thereof; said slot having an edge lying radially closer to said vent valve than the edge of said knob to thereby prevent removal of said safety hood from said closure means until said knob is first removed to thereby vent said vessel.

6. Apparatus for a pressure vessel having two pressure compartments therein and further having closure means with actuating surfaces thereon, said apparatus comprising:

a safety hood mounted on said closure means, said hood being sized and configured to cover and block access to the actuating surfaces of said closure means;

a hollow stem attached to said clsoure means, said stem being in communication with one of said pressure compartments, and having a pair of transverse spaced discs formed on the exterior thereof, both of said discs being spaced from said closure means, and further having a transverse aperture therein between said discs;

said hood having a cylindrical portion in sliding sealing engagement with said discs, said cylindrical portion being apertured between said closure means and the disc lying closest to said closure means;

a vent valve for said other pressure compartment; and actuating means for said vent valve sized and positioned to prevent removal of said safety hood from said closure means until said actuating means is first removed to thereby vent said other pressure compartment;

whereby upon removal of said actuating means, said other pressure compartment is vented and removal of said safety hood is made possible, and whereby upon removal of said hood, the aperture on said hood slides into registry with the space between said spaced discs, to thereby vent said one pressure compartment through said hollow stem, the aperture therein, and the aperture on said hood.

7. Safety closure apparatus in accordance with claim 6 in which said safety hood is slotted to fit over said vent valve, and said vent valve actuating means comprises a knob; said slot having an edge lying radially closer to said vent valve than the edge of said knob.

8. Safety closure apparatus for a pressure stabilizer of the kind comprising an open-ended case adapted to contain working liquid under pressure, a closure plate for the open end of said case, said closure plate having a gas fillable cartridge mounted thereon for positioning in said case and further having a first bore therethrough in communication with said gas cartridge and a second bore therethrough exterior of said gas cartridge, and closure means having actuating surfaces for securing said closure plate against the open end of said case, said safety closure apparatus comprising:

a hollow stem mounted in the first bore of said closure plate and having gas valve means mounted in the end thereof remote from said plate;

said stem further being provided with a pair of transverse aligned discs axially spaced from each other and from said closure plate; p1 said discs each having sealing means mounted on its rim;

said hollow stem being transversely apertured between the discs thereof;

a hollow vent valve body mounted in the second bore of said closure plate;

a vent valve stem threaded into said vent valve body, said vent valve stem having an actuating head of selected transverse dimension larger than said vent valve body;

and a safety hood having a downwardly extending flange covering and blocking access to the actuating surfaces of said closure means, a slot narrower than the actuating head of said vent valve stem, and an upstanding hollow cylinder sized and positioned to engage the sealing means on said discs, said cylinder being transversely apertured between the disc closest to said closure plate and said closure plate;

whereby, upon removal of said vent valve stem and actuating head from said vent valve body, said safety hood may be moved outwardly to bring the aperture of said safety hood cylinder into registry with the space between said spaced discs to vent said gas cartridge through the aperture in said stem and the aperture in said safety hood cylinder.

* * * * *